US011447621B2

(12) United States Patent
Delevati et al.

(10) Patent No.: US 11,447,621 B2
(45) Date of Patent: Sep. 20, 2022

(54) EVA THERMOPLASTIC COMPOUNDS, METHODS THEREOF, AND ARTICLES THEREFROM

(71) Applicant: Braskem S.A., Camaçari (BR)

(72) Inventors: Giancarlos Delevati, São Paulo (BR); Cassia Ruoso, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

(21) Appl. No.: 16/440,682

(22) Filed: Jun. 13, 2019

(65) Prior Publication Data

US 2019/0382566 A1    Dec. 19, 2019

Related U.S. Application Data

(60) Provisional application No. 62/684,626, filed on Jun. 13, 2018.

(51) Int. Cl.

| C08L 23/08 | (2006.01) |
|---|---|
| A43B 1/10 | (2006.01) |
| C08J 3/22 | (2006.01) |
| C08J 9/00 | (2006.01) |
| C08J 9/08 | (2006.01) |
| B29C 41/00 | (2006.01) |
| B29C 41/24 | (2006.01) |
| B29K 23/00 | (2006.01) |
| B29K 105/04 | (2006.01) |
| B29L 31/50 | (2006.01) |

(52) U.S. Cl.
CPC ............ *C08L 23/0853* (2013.01); *A43B 1/10* (2013.01); *C08J 3/226* (2013.01); *C08J 9/0061* (2013.01); *C08J 9/08* (2013.01); *B29C 41/003* (2013.01); *B29C 41/24* (2013.01); *B29K 2023/083* (2013.01); *B29K 2105/04* (2013.01); *B29L 2031/501* (2013.01); *C08J 2203/02* (2013.01); *C08J 2323/08* (2013.01); *C08J 2453/02* (2013.01); *C08J 2491/00* (2013.01); *C08L 2203/14* (2013.01); *C08L 2205/03* (2013.01); *C08L 2205/06* (2013.01); *C08L 2207/322* (2013.01); *C08L 2310/00* (2013.01)

(58) Field of Classification Search
CPC .................................................. C08L 23/0853
See application file for complete search history.

(56) References Cited

U.S. PATENT DOCUMENTS

| 7,159,259 B2 | 1/2007 | Chen | |
|---|---|---|---|
| 2007/0129454 A1* | 6/2007 | Su | C08J 9/103 521/142 |
| 2019/0315949 A1 | 10/2019 | Delevati et al. | |

FOREIGN PATENT DOCUMENTS

| BR | 102012025160 A2 | 11/2013 |
|---|---|---|
| CN | 104817754 A * | 8/2015 |
| CN | 104983117 B | 8/2016 |
| CN | 105968555 A * | 9/2016 |
| GB | 2373506 A * | 9/2002 |
| WO | 2014053037 A1 | 4/2014 |
| WO | 2019111047 A1 | 6/2019 |

OTHER PUBLICATIONS

CN 105968555 A machine translaiton (Sep. 2016).*
CN 104817754 A machine translation (Aug. 2015).*
International Search Report issued in International Application No. PCT/IB2019/02022, dated Sep. 26, 2019 (3 pages).
Written Opinion of the International Seaching Authority issued in International Application No. PCT/IB2019/02022, dated Sep. 26, 2019 (4 pages).

* cited by examiner

*Primary Examiner* — Ana L. Woodward
(74) *Attorney, Agent, or Firm* — Osha Bergman Watanabe & Burton LLP

(57) ABSTRACT

Compositions may include a polymer composition prepared from an ethylene vinyl acetate copolymer, a rubber, and a plasticizer. Compositions may further comprise other components, such as a curing agent and a blowing agent. Articles may include a polymer composition prepared from an ethylene vinyl acetate copolymer, a rubber, and a plasticizer. Methods may include mixing an ethylene vinyl acetate copolymer, a rubber, and a plasticizer; and extruding the mixture thereof.

28 Claims, No Drawings

EVA THERMOPLASTIC COMPOUNDS, METHODS THEREOF, AND ARTICLES THEREFROM

BACKGROUND

Commercial polymer compositions are used to produce a varied range of articles for many different applications. Such compositions may be formulated with a variety of rubbers and other additives to provide articles that possess physical properties well-suited for their intended use. For example, articles that are intended to be for the footwear market may possess, among others, low density, adequate hardness, flexibility, and grip.

Traditional materials that are used in the manufacture of footwear articles, such as boots, including polyvinyl chloride (PVC) and natural rubber, generally provide a compromise between several different properties. Though offering good chemical resistance, especially towards oil and hydrocarbons, PVC articles are generally less flexible, offer less grip, are more prone to punctures and tears, and are much harder and less supple than other materials, such as natural rubber. Additionally, PVC generally offers poor performance at low temperatures. Natural rubber, however, offers poor chemical resistance, particularly towards oil and oil-based solvents, rendering them unsuitable for many applications. The processing difficulty associated with traditional rubber bases such as SBR (styrene-butadiene rubber), natural rubber and/or blends of different synthetic or natural rubbers, has motivated the search for alternative materials having similar or improved properties, such as low abrasion, soft touch and lightness, as well as processability.

Alternative materials of interest include polymer compositions derived from ethylene vinyl acetate (EVA) copolymers. Up to this point, EVA compositions, particularly those of low to medium vinyl acetate content, have not been heavily utilized for the manufacture of articles for the footwear industry. This is generally because such compositions tend to be too hard for use in such applications, despite EVA generally offering superior mechanical and low temperature properties, and similar chemical resistance, to PVC. Polymer compositions containing EVA can be thermoplastic in nature, and so easily formed into articles.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed herein relate to a polymer composition that may include an ethylene vinyl acetate copolymer present in the polymer composition at an amount ranging from 30 to 70 wt % of the polymer composition, a rubber present in the polymer composition at an amount ranging from 5 to 30 wt % of the polymer composition, and a plasticizer present in the polymer composition at an amount ranging from 10 to 40 wt % of the polymer composition.

In another aspect embodiments disclosed herein relate to a polymer composition that may include an ethylene vinyl acetate copolymer; rubber; and a plasticizer, the rubber and the plasticizer being present at a weight ratio ranging from 1:1 to 1:5.

In another aspect, embodiments disclosed herein relate to a thermoplastic article that may include a polymer composition that includes an ethylene vinyl acetate copolymer present in the polymer composition at an amount ranging from 30 to 70 wt % of the polymer composition, a rubber present in the polymer composition at an amount ranging from 5 to 30 wt % of the polymer composition, and a plasticizer present in the polymer composition at an amount ranging from 10 to 40 wt % of the polymer composition.

In another aspect, embodiments disclosed herein relate to a thermoplastic article that may include a polymer composition that includes an ethylene vinyl acetate copolymer; rubber; and a plasticizer, the rubber and the plasticizer being present at a weight ratio ranging from 1:1 to 1:5.

In another aspect, embodiments disclosed herein relate to a cured article that may include a polymer composition that includes an ethylene vinyl acetate copolymer present in the polymer composition at an amount ranging from 30 to 70 wt % of the polymer composition, a rubber present in the polymer composition at an amount ranging from 5 to 30 wt % of the polymer composition, and a plasticizer present in the polymer composition at an amount ranging from 10 to 40 wt % of the polymer composition; and a curing agent.

In another aspect, embodiments disclosed herein relate to a cured article that may include a polymer composition that includes an ethylene vinyl acetate copolymer; rubber; and a plasticizer, the rubber and the plasticizer being present at a weight ratio ranging from 1:1 to 1:5; and a curing agent.

In another aspect, embodiments disclosed herein relate to an expanded article that may include a polymer composition that includes an ethylene vinyl acetate copolymer present in the polymer composition at an amount ranging from 30 to 70 wt % of the polymer composition, a rubber present in the polymer composition at an amount ranging from 5 to 30 wt % of the polymer composition, and a plasticizer present in the polymer composition at an amount ranging from 10 to 40 wt % of the polymer composition; a curing agent; and a blowing agent.

In another aspect, embodiments disclosed herein relate to an expanded article that may include a polymer composition that includes an ethylene vinyl acetate copolymer; rubber; and a plasticizer, the rubber and the plasticizer being present at a weight ratio ranging from 1:1 to 1:5; a curing agent; and a blowing agent.

In yet another embodiment, embodiments disclosed herein relate to a thermoplastic article that includes an ethylene vinyl acetate copolymer-based polymer composition, wherein the article exhibits a Shore A hardness according to DIN 53505 in the range of 40 to 75 Shore A.

In another aspect, embodiments disclosed herein relate to methods that may include mixing an ethylene vinyl acetate copolymer, a rubber, and a plasticizer, and extruding the mixture thereof.

Other aspects and advantages of the claimed subject matter will be apparent from the following description and the appended claims.

DETAILED DESCRIPTION

Embodiments disclosed herein generally relate to thermoplastic polymer compositions containing ethylene vinyl acetate (EVA) copolymers. These compositions may be formulated with rubbers and plasticizers to produce materials suited for a number of diverse applications. Such polymer compositions may possess unique physical properties that may render their use advantageous as compared to traditional materials, such as PVC.

Polymer compositions may be formulated with many different additives to provide articles produced therefrom with the requisite physical properties for their intended use. For example, articles that are intended to be for the footwear market may exhibit, among others, the following characteristics: low density to enable the weight of the footwear to be reduced, adequate hardness, flexibility, and rubbery touch to allow comfortable walking and shock absorbance, adequate grip to prevent slipping, and sufficient abrasion and tear resistance to render the footwear durable and hard-wearing. Additionally, for specific applications, articles may possess further properties such as chemical or fire resistance.

Generally, EVA-derived materials do not exhibit the requisite physical properties, such as hardness, to be used for applications such as footwear. However, the polymer compositions, and articles therefrom, of some embodiments of the present disclosure possess superior properties to traditional materials. Such articles may possess a lower density, a higher abrasion resistance, and a higher tear resistance as compared to conventional PVC articles. Some embodiments are especially suited for use in high performance boots, such as for the refrigeration and oil and gas industries, due to excellent fuel resistance.

In some embodiments, polymer compositions in accordance with the present disclosure may be used for the partial or total replacement of materials such as polyvinyl chloride (PVC) in many applications including, for example, boots, shoe soles, insoles, outsoles, midsoles, unisoles, monobloc sandals, flip-flops, and the like, while retaining the required technical requirements demanded by these applications. In one related aspect, embodiments disclosed herein may be directed towards thermoplastic polymer compositions. The thermoplastic nature of some compositions of the present disclosure enables their use as a substitute for PVC, without requiring substantial changes in machinery or protocol. In some embodiments, articles comprising polymer compositions can be formed through cold runner injection molding.

The EVA copolymers of one or more embodiments have low to medium vinyl acetate (VA) content. Such copolymers often lead to compositions that are too hard for use in certain applications, such as in the footwear industry. In some embodiments of the present disclosure, it is found that the incorporation of at least one rubber component and plasticizer with low-VA content EVA copolymers yields polymer compositions with enhanced softness. In some embodiments, the softness of high-VA content EVA compositions may also be improved with the incorporation of rubber and plasticizer components.

Polymer compositions containing EVA may have their softness enhanced through the addition of plasticizers. However, EVA polymer compositions are not able to absorb large quantities of plasticizer without the addition of additives, with the maximum amount of plasticizer they can absorb being of about 6-7% by weight (wt %). The addition of rubber components enhances the ability of the composition to absorb plasticizer, permitting the compositions, of some embodiments, to possess a high plasticizer content and, thus, enhanced softness.

Polymer compositions, and articles therefrom, of one or more embodiments of the present disclosure may include a thermoplastic ethylene vinyl acetate (EVA) composition comprising an EVA copolymer, a rubber, and a plasticizer. The major components of thermoplastic compositions of the present disclosure, in addition to their respective properties, are detailed below.

EVA Copolymer

Polymer compositions of the present invention may incorporate one or more ethylene-vinyl acetate (EVA) copolymers prepared by the copolymerization of ethylene and vinyl acetate. In some embodiments, the EVA copolymer can be derived from petroleum or renewable sources (such as biobased EVA). Biobased EVA is an EVA wherein at least one of ethylene and/or vinyl acetate monomers are derived from renewable sources, such as ethylene derived from biobased ethanol.

In one or more embodiments, EVA copolymers in accordance with the present disclosure may include a percent by weight (wt %) of vinyl acetate content as determined by ASTM D5594 that ranges from a lower limit of about 2 wt % to an upper limit of about 50 wt %. In some embodiments, the amount of vinyl acetate may be of the range 5-40 wt % of the EVA copolymer. In one or more embodiments, the lower limit may range from 2, 5, 8, 10, 12, 15, or 20 wt %, and the upper limit may range from 20, 25, 30, 35, 40, 45 or 50 wt %, where any lower limit may be used in combination with any upper limit.

In some embodiments, EVA copolymers in accordance with the present disclosure may include a percent by weight of ethylene that ranges from a lower limit of about 50 wt % to an upper limit of about 98 wt %.

EVA copolymers in accordance with the present disclosure may have a melt flow index (MFI) at 190° C. and 2.16 kg as determined according to ASTM D1238 in a range having a lower limit of 1 g/10 min to an upper limit of 45 g/10 min.

EVA copolymers in accordance with the present disclosure may have a density determined according to ASTM D792 in a range having a lower limit of 0.80 g/cm$^3$ to an upper limit selected of 0.98 g/cm$^3$.

Polymer compositions of one or more embodiments of the present disclosure may contain an EVA copolymer at a percent by weight of the composition that ranges from a lower limit of 20 wt % to an upper limit of 90 wt %. In some embodiments, the amount of EVA copolymer may be of the range 30-70 wt % of the polymer composition. In one or more embodiment, the lower limit may range from 20, 25, 30, 35, 40, or 45 wt %, and the upper limit may range from 45, 50, 55, 60, 65, 70, 80, or 90%, where any lower limit may be used with any upper limit.

Rubber

Polymer compositions of the present invention may incorporate one or more rubber components. In some embodiments, rubbers in accordance with the present disclosure may include one or more of natural rubber, poly-isoprene (IR), styrene and butadiene rubber (SBR), polybutadiene, nitrile butadiene rubber (NBR); ethylene-propylene rubber (EPR), ethylene-propylene-diene monomer rubber (EPDM), acrylic rubbers, halogen rubbers such as halogenated butyl rubbers including brominated butyl rubber and chlorinated butyl rubber, brominated isobutylene, polychloroprene, and the like; silicone rubbers such as methylvinyl silicone rubber, dimethyl silicone rubber, and the like, sulfur-containing rubbers such as polysulfidic rubber; fluorinated rubbers; thermoplastic rubbers such as elastomers based on styrene, butadiene, isoprene, ethylene and/or propylene, styrene-isoprene-styrene (SIS), styrene-ethylene-butylene-styrene (SEBS), styrene-butylene-styrene (SBS), and the like, ester-based elastomers, elastomeric polyurethane, elastomeric polyamide, and the like. Further, in some embodiments any rubber that is capable of absorbing plasticizers, such as oil, may be used.

In one or more embodiments, rubbers in accordance with the present disclosure may have a hardness, determined in accordance with ASTM D2240, of a range having a lower limit of 10 Shore A to an upper limit of 80 Shore A.

In some embodiments, polymer compositions in accordance with the present disclosure may contain a rubber at a percent by weight (wt %) of the composition that ranges from a lower limit of 0.5 wt % to an upper limit of 40 wt %. In one or more embodiments, the amount of rubber may be of the range 5-30 wt % of the polymer composition. In one or more embodiments, the lower limit may range from any of 0.5, 1, 2, 5, 10, or 15 wt %, and the upper limit may range from any of 20, 25, 30, 35, or 40 wt %, where any lower limit can be used in combination with any upper limit.

In one or more embodiments, polymer compositions according to the present invention may include a second rubber component. The second rubber component may be selected from a group consisting of hydrogenated nitrile butadiene rubber, nitrile carboxylated rubber, epichlorohydrin, or combinations thereof. Further, in some embodiments any rubber that has a desirable resistance to fuels may be used. In one or more embodiments, a polymer composition may contain an amount of the second rubber in the range of 5-10 wt % of the polymer composition. In one or more embodiments, the lower limit may range from any of 0.5, 1, 2 or 5 wt %, and the upper limit may range from any of 6, 8, 10, 15, or 20 wt %, where any lower limit can be used in combination with any upper limit.

Plasticizer

In one or more embodiments, polymer compositions in accordance with the present disclosure may incorporate one or more plasticizers to adjust the physical properties and processability of the composition. In some embodiments, plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, tri-methyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), mono-methyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3 gh), tetraethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers.

In one or more embodiments, polymer compositions in accordance with the present disclosure may contain a plasticizer at a percent by weight of the composition that range from a lower limit of 0.5 wt % to an upper limit of 50 wt %.

In some embodiments the polymer composition may contain a plasticizer in an amount of the range 10-40 wt %. In one or more embodiments, the plasticizer may have a lower limit of any of 0.5, 1, 2, 5, 10, 15, 20, or 25 wt %, and an upper limit of 25, 30, 35, 40, 45, or 50 wt %, where any lower limit can be used in combination with any upper limit.

In one or more embodiments, a plasticizer of a polymer composition may be absorbed, to at least a partial extent, by the rubber component of the composition. In some embodiments, a polymer composition may contain a rubber and a plasticizer in a ratio of the range 1:1-1:5 by weight.

Curing Agent

Polymer compositions in accordance with the present disclosure may include one or more curing agents capable of promoting curing. In one or more embodiments, curing the polymer composition leads to the generation of a thermoset mixture. In some embodiments, curing the polymer composition will lead to an alteration of the compositions physical properties, such as its hardness, abrasion resistance, grip, and the like.

In one or more embodiments, the curing agents may be one or more peroxides such as benzoyl peroxide, dicumyl peroxide, di-tert-butyl peroxide, tert-butyl cumyl peroxide, tert-butyl 3,5,5-trimethylhexanoate peroxide, tert-butyl peroxybenzoate, 2-ethylhexyl carbonate tert-butyl peroxide, 2,5-dimethyl-2,5-di (tert-butylperoxide) hexane, 1,1-di(tert-butylperoxide)-3,3,5-trimethylcyclohexane,2,5-dimethyl-2, 5-di(tertbutylperoxide), hexyne-3,3,3,5,7,7-pentamethyl-1, 2,4-trioxepane, butyl 4,4-di (tert-butylperoxide) valerate, di (2,4-dichlorobenzoyl) peroxide, di(4-methylbenzoyl) peroxide, peroxide di(tert-butylperoxyisopropyl) benzene, 2,5-di (cumylperoxy)-2,5-dimethyl hexane, 2,5-di(cumylperoxy)-2,5-dimethyl hexyne-3,4-methyl-4-(t-butylperoxy)-2-pentanol, 4-methyl-4-(t-amylperoxy)-2-pentanol,4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di (t-butylperoxy)hexane, 2,5-dimethyl-2,5-di(t-amylperoxy) hexane, 2,5-dimethyl-2,5-di(t-butylperoxy)hexyne-3, 2,5-dimethyl-2,5-di(t-amylperoxy)hexyne-3, 2,5-dimethyl-2-t-butylperoxy-5-hydroperoxyhexane, 2,5-dimethyl-2-cumylperoxy-5-hydroperoxy hexane, 2,5-dimethyl-2-t-amylperoxy-5-hydroperoxyhexane, m/p-alpha, alpha-di[(t-butylperoxy)isopropyl]benzene, 1,3,5-tris(t-butylperoxyisopropyl) benzene, 1,3,5-tris(t-amylperoxyisopropyl)benzene, 1,3,5-tris(cumylperoxyisopropyl)benzene, di[1,3-dimethyl-3-(t-butylperoxy)butyl]carbonate, di[1,3-dimethyl-3-(t-amylperoxy)butyl]carbonate, di[1,3-dimethyl-3-(cumylperoxy) butyl]carbonate, di-t-amyl peroxide, t-amyl cumyl peroxide, t-butyl-isopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl]benzene, 1,3-dimethyl-3-(t-butylperoxy)butanol, 1,3-dimethyl-3-(t-amylperoxy)butanol, di(2-phenoxyethyl)peroxydicarbonate, di(4-t-butylcyclohexyl)peroxydicarbonate, dimyristyl peroxydicarbonate, dibenzyl peroxydicarbonate, di(isobomyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutyl methacrylate, tri(1,3-dimethyl-3-t-butylperoxy butyloxy)vinyl silane, 1,3-dimethyl-3-(t-butylperoxy)butyl N-[1-{3-(1-methylethenyl)-phenyl) 1-methylethyl]carbamate, 1,3-dimethyl-3-(t-amylperoxy) butyl N-[1-{3(1-methylethenyl)-phenyl}-1-methylethyl] carbamate, 1,3-dimethyl-3-(cumylperoxy))butyl N-[1-{3-(1-methylethenyl)-phenyl}-1-methylethyl]carbamate, 1,1-di (t-butylperoxy)-3,3,5-trimethylcyclohexane, 1,1-di(t-butylperoxy)cyclohexane, n-butyl 4,4-di(t-amylperoxy)valerate, ethyl 3,3-di(t-butylperoxy)butyrate, 2,2-di(t-amylperoxy) propane, 3,6,6,9,9-pentamethyl-3-ethoxycarbonylmethyl-1,2,4,5-tetraoxacyclononane, n-buty 1-4,4-bis(t-butylperoxy) valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methyl ethyl ketone peroxide cyclic trimer), methyl ethyl ketone peroxide cyclic dimer, 3,3,6,6,9,9-hexamethyl-1,2,4,5-tetraoxacyclononane, 2,5-dimethyl-2,5-di(benzoylperoxy) hexane, t-butyl perbenzoate, t-butylperoxy acetate, t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butylperoxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl)monoperoxy carbonate, 1,1,1-tris[2-(t-butylperoxy-carbonyloxy)ethoxymethyl] propane, 1,1,1-tris[2-(t-amylperoxy-carbonyloxy)ethoxymethyl]propane, 1,1,1-tris[2-(cumylperoxy-carbonyloxy)ethoxymethyl]propane, OO-t-amyl-O-isopropylmonoperoxy carbonate, di(4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide and combinations thereof.

In one or more embodiments, polymeric compositions in accordance with the present disclosure may contain one or more curing agents in an amount of the range 1-3 wt %.

Blowing Agent

Polymeric compositions in accordance with the present disclosure may include one or more blowing agents to produce expanded polymeric compositions and foams. Blowing agents may include solid, liquid, or gaseous blowing agents. In embodiments utilizing solid blowing agents, blowing agents may be combined with a polymer composition as a powder or granulate.

Blowing agents in accordance with the present disclosure include chemical blowing agents that decompose at polymer processing temperatures, releasing the blowing gases such as $N_2$, CO, $CO_2$, and the like. Examples of chemical blowing agents may include organic blowing agents, including hydrazines such as toluenesulfonyl hydrazine, hydrazides such as oxydibenzenesulfonyl hydrazide, diphenyl oxide-4,4'-disulfonic acid hydrazide, and the like, nitrates, azo compounds such as azodicarbonamide, cyanovaleric acid, azobis(isobutyronitrile), and N-nitroso compounds and other nitrogen-based materials, and other compounds known in the art.

Inorganic chemical blowing agents may include carbonates such as sodium hydrogen carbonate (sodium bicarbonate), sodium carbonate, potassium bicarbonate, potassium carbonate, ammonium carbonate, and the like, which may be used alone or combined with weak organic acids such as citric acid, lactic acid, or acetic acid.

In one or more embodiments, polymeric compositions in accordance with the present disclosure may contain one or more blowing agents at a weight percent based in the total composition (wt %) that ranges from a lower limit selected from one of 0.5, 0.75, 1, 1.5, 2, to an upper limit selected from one of 2.5, 3 and 3.5 wt %, where any lower limit can be used with any upper limit.

Additives

Polymer compositions in accordance with the present disclosure may include fillers and additives that modify various physical and chemical properties when added to the polymer composition during blending that include one or more polymer additives such as kickers, processing aids, lubricants, antistatic agents, clarifying agents, nucleating agents, beta-nucleating agents, slipping agents, antioxidants, antacids, light stabilizers such as HALS, IR absorbers, whitening agents, organic and/or inorganic dyes, anti-blocking agents, processing aids, flame-retardants, plasticizers, biocides, and adhesion-promoting agents.

Polymer compositions in accordance with the present disclosure may include one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS).

In one or more embodiments, polymer compositions in accordance with the present disclosure may contain a percent by weight of the total composition (wt %) of one or more fillers that ranges from a lower limit selected from one of 0.02 wt %, 0.05 wt %, 1.0 wt %, 5.0 wt %, 10.0 wt %, 15.0 wt %, and 20.0 wt %, to an upper limit selected from one of 25 wt %, 30 wt %, 40 wt %, 50 wt %, 60 wt %, and 70 wt %, where any lower limit can be used with any upper limit.

Applications

In one or more embodiments, polymer compositions of the current disclosure can be used in various article manufacturing processes, including extrusion molding, injection molding, thermoforming, cast film extrusion, blown film extrusion, foaming, extrusion blow-molding, ISBM (Injection Stretched Blow-Molding), 3D printing, rotomolding, pultrusion, and the like, to produce manufactured articles.

In one or more embodiments, polymer compositions of the current disclosure may be used to manufacture articles for the footwear industry, specific examples including shoe soles, midsoles, outsoles, unisoles, insoles, monobloc sandals, flip flops, full EVA footwear, boots, and the like. Other manufactured articles may be sportive articles, seals, hoses, gaskets, foams, foam mattresses and automotive parts, and the like. In particular embodiments, a thermoplastic article formed from the polymer compositions may include articles such as boots, shoe soles, monobloc sandals, flip flops, sportive articles, hoses, and automotive parts. Cured articles formed from the polymer compositions may include articles such as boots, shoe soles, midsoles, outsoles, unisoles, insoles, monobloc sandals, flip flops, full EVA footwear, sportive articles, seals, hoses, gaskets and automotive parts. Cured and expanded articles formed from the polymer compositions may include articles such as shoe soles, midsoles, outsoles, unisoles, insoles, monobloc sandals, flip flops, full EVA footwear, sportive articles, hoses, gaskets, foams, foam mattresses and automotive parts.

In one or more embodiments, an article manufactured from a polymer composition of the current disclosure may be a cured article. In some embodiments, a cured article may possess different mechanical properties as compared to an uncured article. In one or more embodiments, the cured article will be a thermoset material.

In one or more embodiments, an article manufactured from a polymer composition of the current disclosure may be an expanded article. In some embodiments, an expanded article may possess different mechanical properties as compared to a compact article.

Physical Properties of Thermoplastic Articles Comprising Polymer Compositions

The properties of an article formed according to the present disclosure will generally be suitable for the articles intended use. One of ordinary skill in the art will, with the benefit of this present disclosure, appreciate that altering the relative amounts and/or identities of the components of a polymer composition will influence the properties of an article formed therefrom.

In one or more embodiments, the articles formed by the polymer compositions are thermoplastic, i.e., articles that are not cured.

In one or more embodiments, thermoplastic articles in accordance with the present disclosure may exhibit an abrasion resistance according to DIN 53516 of less than about 250 $mm^3$. In one or more embodiments, the abrasion resistance may be less than about 250 $mm^3$, 180 $mm^3$, or 170 $mm^3$.

In one or more embodiments, thermoplastic articles in accordance with the present disclosure may exhibit a hardness Shore A according to DIN 53505 in the range of about 40 to 75 Shore A. In one or more embodiments, the Shore A hardness may have a lower limit of any of 40, 45, or 50 Shore A, and an upper limit of any of 65, 70, or 75 Shore A, where any lower limit can be used in combination with any upper limit.

In one or more embodiments, thermoplastic articles in accordance with the present disclosure may exhibit a density according to DIN 53479 of less than about 1.25 $g/cm^3$. In one or more embodiments, the density may be less than about 1.25 or 1.10 $g/cm^3$.

In one or more embodiments, thermoplastic articles in accordance with the present disclosure may have a tear resistance according to DIN ABNT NBR ISO 20347:2015 that is at least about 8 kN/m.

Methods of Polymer Composition and Article Preparation

In one or more embodiments, polymer compositions in accordance with the present disclosure may be combined using any post-reactor melt mixture process, including kneaders, Banbury mixers, mixing rollers, extrusion processes with a single, double, or multi-screw extruder. By mixing components subsequent to synthesis, each component may be purified to specified standards and then combined to generate the final composition while minimizing the presence of reactants and degradation products. In embodiments prepared from multiple components, a subset of the components may be combined by melt mixing followed by subsequent mixing steps, or all components may be melt mixed simultaneously.

In one or more embodiments, articles comprising polymer compositions in accordance with the present disclosure may be prepared at temperatures ranging from 90° C. to 210° C. in some embodiments, and from 110° C. to 180° C. in some embodiments. In one or more embodiments, methods of preparing polymer compositions may involve a single mixing or multiple mixing steps in which components may be simultaneously or separately added. In some embodiments, raw materials may be added to a melt mixture device such as kneaders, banburys, or extruders in the form of powder, granules, flakes or dispersion in liquids as solutions, emulsions and suspensions of one or more components.

The polymer mixture may be extruded for later pelletization.

In one or more embodiments, an ethylene vinyl acetate copolymer, one or more rubbers, and a plasticizer may be mixed together before the mixture is extruded. In some embodiments the mixing occurs prior to addition to an extruder. In other embodiments, the mixing occurs inside the extruder. In one or more embodiments, the plasticizer is initially mixed with one or more rubbers prior to mixing with the ethylene vinyl acetate copolymer, and subsequent extrusion. In one or more embodiments, a curing agent may be added to the mixture. In one or more embodiments, a curing agent and a blowing agent may be added to the mixture. In some embodiments, an extruded mixture of a polymer composition, according to the present disclosure, is used to form an article. In one or more embodiments, the article may be formed by a method such as injection molding, compression molding, extrusion molding or blow molding. When a curing agent or a curing agent and a blowing agent is present in the mixture, it is envisioned that the molding process will also comprise a curing step, when a cured article is intended, or an expansion and curing step, when an expanded article is intended. Such curing and/or expansion may occur within a mold, such as after injection molding.

Examples

The following examples are merely illustrative, and should not be interpreted as limiting the scope of the present disclosure.

Shown in Table 1 are the compositions used to form two example articles. Both examples were formulated with Braskem 8019PE EVA copolymers (18.0% vinyl acetate content), SEBS rubber (either Kraton® MD6958 or G1633 rubbers), and a paraffin oil plasticizer.

TABLE 1

Example Compositions

| Material | Example 1 (wt %) | Example 2 (wt %) |
|---|---|---|
| EVA (8019PE) | 50.4 | 50.4 |
| Rubber (Kraton MD6958) | 11.8 | — |
| Rubber (Kraton G1633) | — | 11.8 |
| Plasticizer (paraffin oil) | 21.2 | 21.2 |
| Calcium carbonate | 16 | 16 |
| Antioxidant (Irganox ® 1076) | 0.3 | 0.3 |
| Slip Agent (Crodamide) | 0.3 | 0.3 |

Some of the physical properties of the example articles were tested by standard methods. The results are compiled in Table 2.

TABLE 2

Physical Properties of Articles

| Properties | Standard | Example 1 | Example 2 |
|---|---|---|---|
| Abrasion Resistance | DIN 53 516 | 248.16 $mm^3$ | 160.47 $mm^3$ |
| Density | DIN 53 479 | 1.031 $g/cm^3$ | 1.040 $g/cm^3$ |
| Hardness | DIN 53 505 | 65 Shore A | 68 Shore A |

As can be seen in Table 2, the compositions of these embodiments gave hardness, abrasion resistance, and density properties useful for use in a varied number of applications. Such compositions indicate that some embodiments of the present invention offer more desirable properties than conventional PVC articles. For example, regarding injected footwear applications, such as boots.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A thermoplastic article comprising a polymer composition, comprising:
    an ethylene vinyl acetate copolymer present in the polymer composition in an amount ranging from 30 to 70 wt % of the polymer composition;
    rubber, different from the ethylene vinyl acetate copolymer; and
    a plasticizer present in the polymer composition in an amount ranging from 10 to 40 wt % of the polymer composition, the rubber and the plasticizer being present at a weight ratio ranging from 1:1 to 1:5,
    wherein the article is selected from the group consisting of boots, shoe soles, monobloc sandals, flip flops, sportive articles, hoses, and automotive parts, and
    wherein the article exhibits a Shore A hardness according to DIN 53505 in the range of 40 to 75 Shore A.

2. The thermoplastic article of claim 1, wherein the ethylene vinyl acetate copolymer has a vinyl acetate content ranging from 5 to 40 wt % of the ethylene vinyl acetate.

3. The thermoplastic article of claim 1, wherein the rubber is at least one selected from natural rubber; poly-isoprene (IR); styrene and butadiene rubber (SBR); polybutadiene; nitrile butadiene rubber (NBR); ethylene-propylene rubber (EPR); ethylene-propylene-diene monomer rubber (EPDM); acrylic rubbers; halogen rubbers; brominated isobutylene; polychloroprene; silicone rubbers; sulfur-containing rubbers; fluorinated rubbers; elastomers based on styrene, butadiene, isoprene, ethylene and/or propylene, different from the ethylene vinyl acetate copolymer; styrene-isoprene-styrene (SIS); styrene-ethylene-butylene-styrene (SEBS); styrene-butylene-styrene (SBS); ester-based elastomers, different from the ethylene vinyl acetate copolymer; elastomeric polyurethane; or elastomeric polyamide.

4. The thermoplastic article of claim 3 wherein the rubber is at least one selected from SBR; NBR; EPR; EPDM; elastomers based on styrene, butadiene, isoprene, ethylene and/or propylene, different from the ethylene vinyl acetate copolymer; SIS; SEBS; SBS, ester-based elastomers, different from the ethylene vinyl acetate copolymer; elastomeric polyurethane; or elastomeric polyamide.

5. The thermoplastic article of claim 1, wherein the rubber is a SEBS rubber.

6. The thermoplastic article of claim 1, wherein the plasticizer is absorbed by the rubber to at least a partial extent.

7. The thermoplastic article of claim 1, wherein the polymer composition further comprises a curing agent.

8. The thermoplastic article of claim 7, wherein the curing agent is present in the polymer composition in an amount ranging from 1 to 3 wt % of the polymer composition.

9. The thermoplastic article of claim 7, further comprising a blowing agent.

10. The thermoplastic article of claim 9, wherein the blowing agent is present in the polymer composition in an amount ranging from 0.5 to 3.5 wt % of the polymer composition.

11. The thermoplastic article of claim 1, wherein the polymer composition is not expanded in the article.

12. A thermoplastic article comprising a polymer composition comprising:
    an ethylene vinyl acetate copolymer present in the polymer composition in an amount ranging from 30 to 70 wt % of the polymer composition;
    rubber, different from the ethylene vinyl acetate copolymer, present in the polymer composition in an amount ranging from 5 to 30 wt % of the polymer composition; and
    a plasticizer present in the polymer composition in an amount ranging from 10 to 40 wt % of the polymer composition, the rubber and the plasticizer being present at a weight ratio ranging from 1:1 to 1:5,
    wherein the article is selected from the group consisting of boots, shoe soles, monobloc sandals, flip flops, sportive articles, hoses, and automotive parts, and
    wherein the article exhibits a Shore A hardness according to DIN 53505 in the range of 40 to 75 Shore A.

13. The thermoplastic article of claim 12, wherein the polymer composition further comprises: a second rubber component.

14. The thermoplastic article of claim 13, wherein the second rubber component is selected from hydrogenated nitrile butadiene rubber, nitrile carboxylated rubber, epichlorohydrin, or combinations thereof.

15. The thermoplastic article of claim 13, wherein the second rubber component is present in the polymer composition in an amount ranging from 5 to 10 wt % of the polymer composition.

16. The thermoplastic article of claim 12, wherein the article has an abrasion resistance according to DIN 53516 less than about 250 $mm^3$.

17. The thermoplastic article of claim 12, wherein the article exhibits a density according to DIN 53479 that is less than about 1.25 $g/cm^3$.

18. The thermoplastic article of claim 12, wherein the article exhibits a tear resistance according to ABNT NBR ISO 20347:2015 that is at least about 8 kN/m.

19. A boot comprising a polymer composition comprising:
    an ethylene vinyl acetate copolymer present in the polymer composition in an amount ranging from 30 to 70 wt % of the polymer composition;
    rubber, different from the ethylene vinyl acetate copolymer, present in the polymer composition in an amount ranging from 5 to 30 wt % of the polymer composition; and
    a plasticizer present in the polymer composition in an amount ranging from 10 to 40 wt % of the polymer composition, the rubber and the plasticizer being present at a weight ratio ranging from 1:1 to 1:5,
    wherein the boot exhibits a Shore A hardness according to DIN 53505 in the range of 40 to 75 Shore A.

20. A cured article comprising a polymer composition comprising:
- an ethylene vinyl acetate copolymer present in the polymer composition in an amount ranging from 30 to 70 wt % of the polymer composition;
- rubber, different from the ethylene vinyl acetate copolymer, present in the polymer composition in an amount ranging from 5 to 30 wt % of the polymer composition;
- a plasticizer present in the polymer composition in an amount ranging from 10 to 40 wt % of the polymer composition, the rubber and the plasticizer being present at a weight ratio ranging from 1:1 to 1:5; and
- a curing agent,
- wherein the article exhibits a Shore A hardness according to DIN 53505 in the range of 40 to 75 Shore A.

21. The cured article of claim 20, wherein the article is selected from the group consisting of boots, shoe soles, midsoles, outsoles, unisoles, insoles, monobloc sandals, flip flops, full EVA footwear, sportive articles, seals, hoses, gaskets and automotive parts.

22. A method, comprising:
- mixing an ethylene vinyl acetate copolymer, a rubber different from the ethylene vinyl acetate copolymer, and a plasticizer, wherein the ethylene vinyl acetate copolymer is present in an amount ranging from 30 to 70 wt% of the mixture, the plasticizer is present in an amount ranging from 10 to 40 wt% of the mixture, and the rubber and the plasticizer being present at a weight ratio ranging from 1:1 to 1:5;
- extruding the mixture of ethylene vinyl acetate copolymer, the rubber, and the plasticizer; and
- forming an article from the extruded mixture, wherein the article is selected from the group consisting of boots, shoes soles, monobloc sandals, flip flops, sportive articles, hoses, and automotive parts and wherein the article exhibits a Shore A hardness according to DIN 53505 in the range of 40 to 75 Shore A.

23. The method of claim 22, wherein the mixing comprises:
- pre-mixing the rubber and the plasticizer together prior to mixing with the ethylene vinyl acetate copolymer.

24. The method of claim 22, wherein the mixing occurs in an extruder.

25. The method of claim 22, wherein the mixing occurs prior to the extruding.

26. The method of claim 22, further comprising: adding a curing agent to the mixture.

27. The method of claim 22, further comprising: adding a blowing agent and a curing agent to the mixture.

28. The method of claim 22, wherein the forming comprises injection molding, compression molding, extrusion molding or blow molding.

* * * * *